United States Patent [19]
Leroux et al.

[11] Patent Number: 5,199,222
[45] Date of Patent: Apr. 6, 1993

[54] DEVICE FOR GRINDING THE HEAD OF A VALVE, ESPECIALLY OF AN INTERNAL-COMBUSTION ENGINE

[75] Inventors: Jacques Leroux, Annecy le Vieux; Patrick Vivier, Faverges, both of France

[73] Assignee: Serdi-Societe d'Etudes de Realisation et de Diffusion Industrielles, Annecy, France

[21] Appl. No.: 696,137

[22] Filed: May 6, 1991

[30] Foreign Application Priority Data

May 7, 1990 [FR] France ............................... 90 06192
Sep. 10, 1990 [FR] France ............................... 90 11354

[51] Int. Cl.$^5$ .............................................. B24B 5/36
[52] U.S. Cl. ................................ 51/105 VG; 51/236; 51/289 R
[58] Field of Search ......... 51/103 R, 105 R, 105 VG, 51/236, 237 R, 48 R, 50 R, 217 R, 217 T, 216, 241 VS, 165.77, 165.78, 165.8, 165.81, 165.87, 165.88, 289 R

[56] References Cited

U.S. PATENT DOCUMENTS

| | | | |
|---|---|---|---|
| 1,421,133 | 6/1922 | Albertson | 51/103 R |
| 1,694,705 | 12/1928 | Hall | 51/105 VG |
| 1,702,022 | 12/1930 | Miller . | |
| 1,702,267 | 2/1929 | Miller . | |
| 1,786,023 | 12/1930 | Miller | 51/105 VG |
| 2,136,188 | 11/1938 | Gagne et al. | 51/105 VG |
| 2,618,105 | 11/1952 | Anderson | 51/48 R |
| 4,270,427 | 6/1981 | Colberg et al. | 83/473 |
| 4,428,160 | 1/1984 | Willemsen et al. | 51/241 VS |
| 5,070,653 | 12/1991 | Amundsen | 51/105 VG |

FOREIGN PATENT DOCUMENTS

| | | |
|---|---|---|
| 394871 | 5/1924 | Fed. Rep. of Germany . |
| 706721 | 4/1941 | Fed. Rep. of Germany . |
| 1951575 | 6/1971 | Fed. Rep. of Germany . |
| 3041722 | 6/1982 | Fed. Rep. of Germany . |
| 529605 | 12/1921 | France ............... 51/105 VG |
| 1066669 | 6/1954 | France . |
| 1415175 | 9/1965 | France . |

*Primary Examiner*—Bruce M. Kisliuk
*Assistant Examiner*—Bryan Reichenbach
*Attorney, Agent, or Firm*—Oliff & Berridge

[57] ABSTRACT

A device for grinding the head of a valve, especially of an internal-combustion engine, has a rigid stand, a structure for supporting the valve stem in terms of rotation that is arranged fixedly and vertically on the stand, a stop for rotational bearing against the valve tail, and a drive mechanism for driving the valve in rotation by the front face. The drive mechanism is arranged vertically below the structure for supporting the valve stem in terms of rotation with a coupling to compensate for any misalignment between the axis of rotation of the drive mechanism and the axis of rotation of the valve stem. A machining station is mounted on the stand having a machining tool mounted thereto in an orientable manner so that the machining axis may be adjusted in relation to the fixed and vertical reference system of the valve stem.

17 Claims, 9 Drawing Sheets

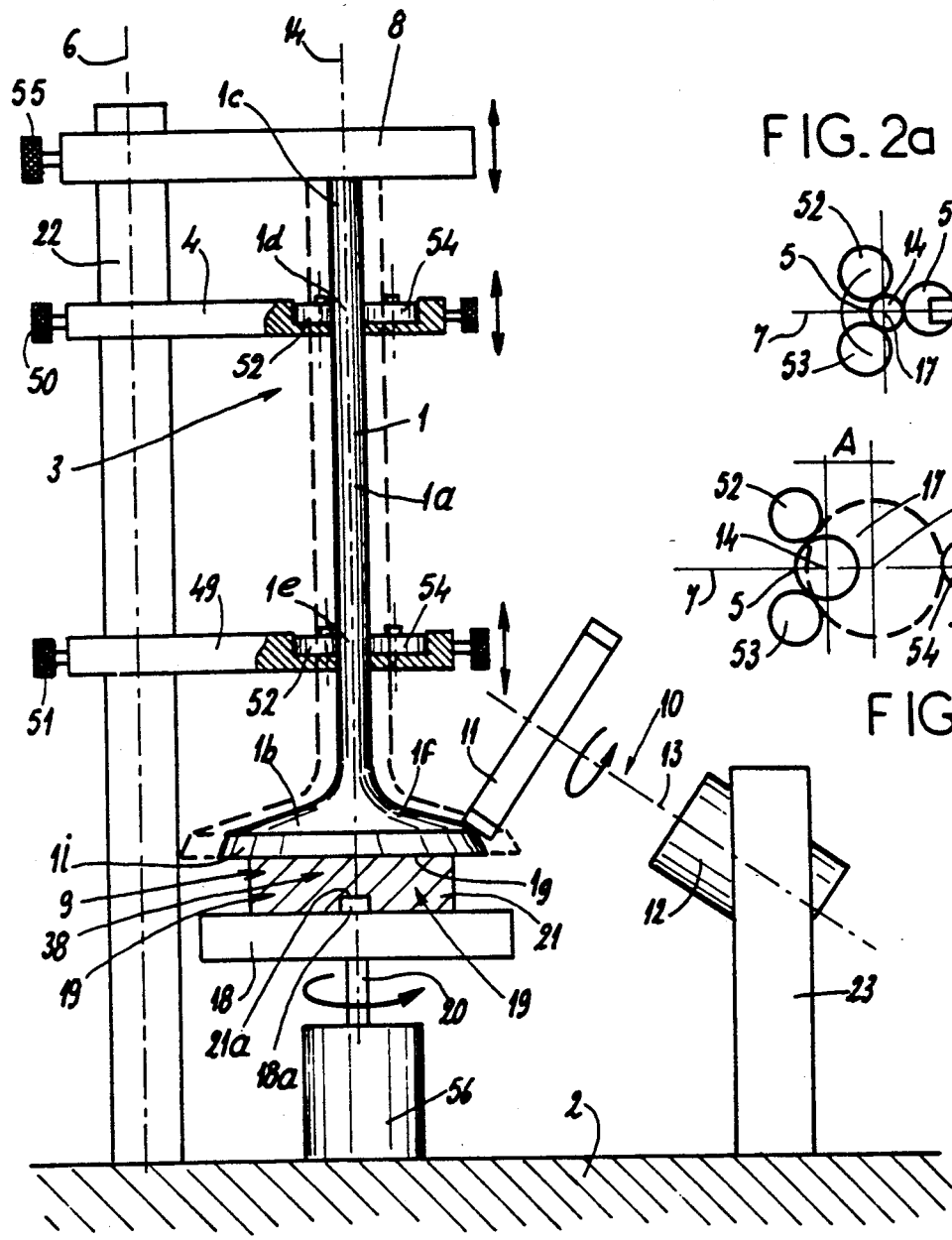

FIG_8

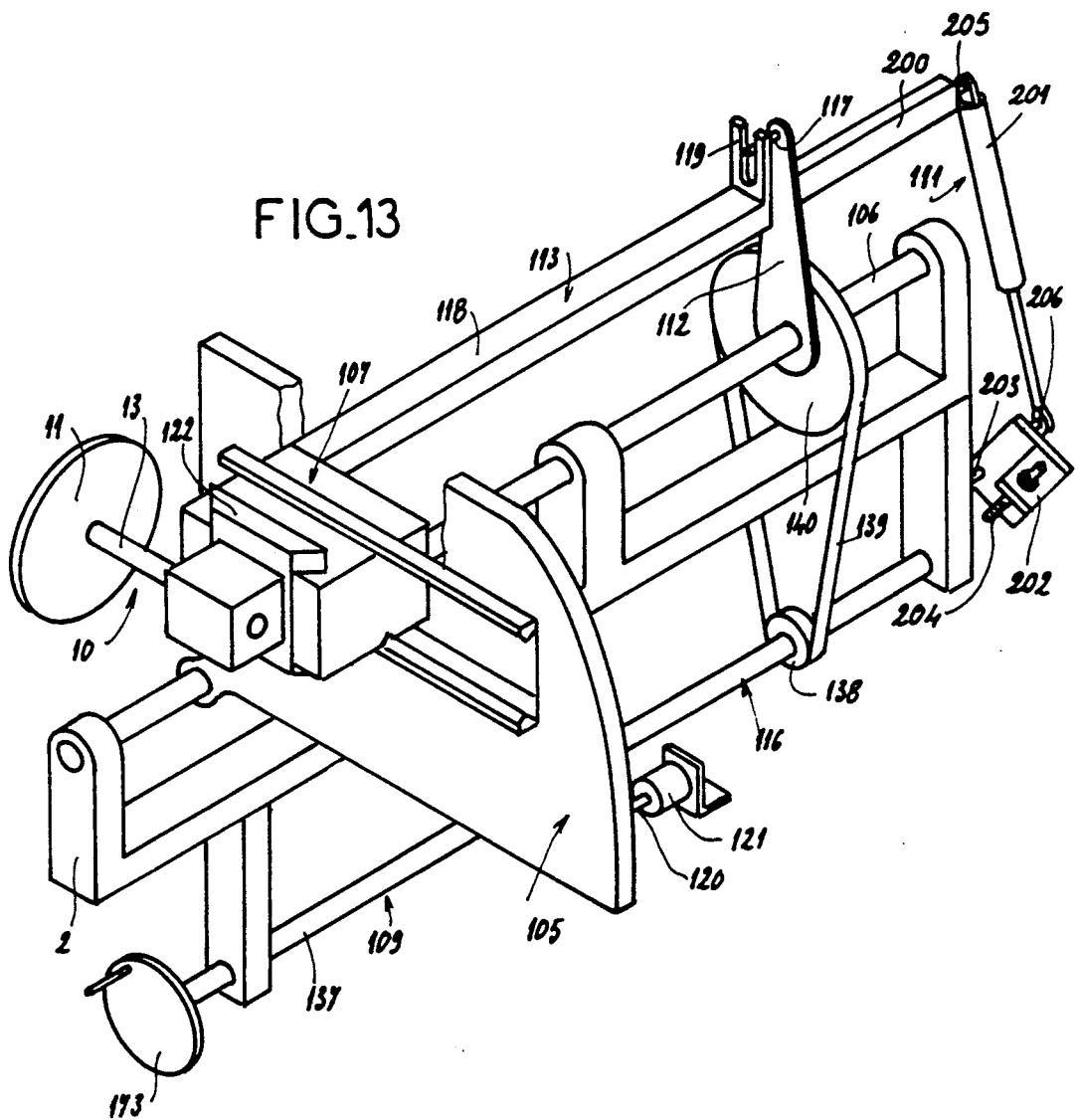

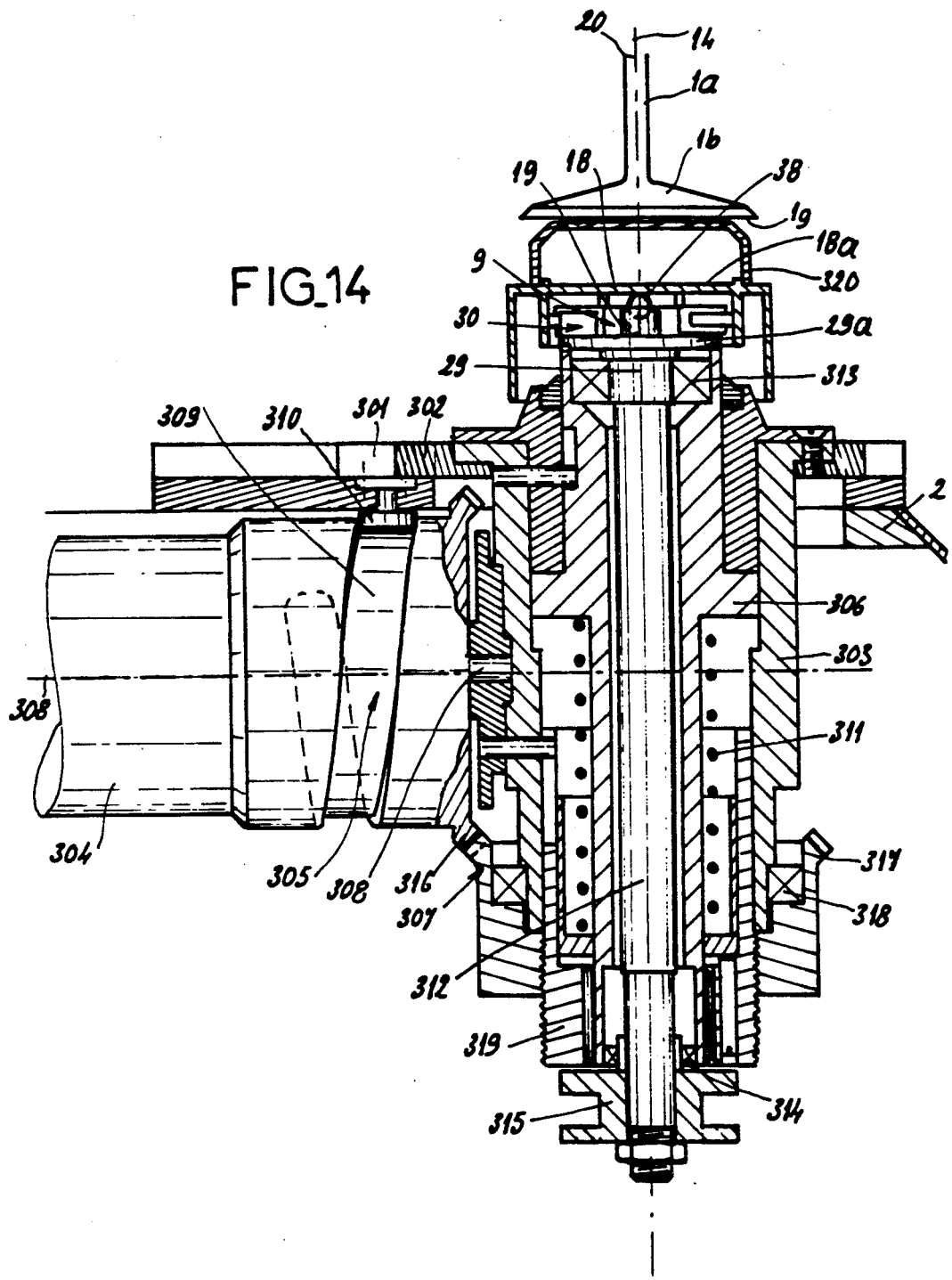

DEVICE FOR GRINDING THE HEAD OF A VALVE, ESPECIALLY OF AN INTERNAL-COMBUSTION ENGINE

BACKGROUND OF THE INVENTION

The present invention relates to a device for grinding the head of a valve, especially of an internal-combustion engine.

The present invention is described and explained by reference to the valves of thermal combustion engines, especially internal-combustion engines. It must be understood, however, that the scope of the present invention should not be limited to this technical sector, because many other members having the shape of a valve or described as such have to be machined or ground in order to fit a complementary sealingly closing seat; as an example of another technical sector to which the present invention can apply, that of sealing sluices may be mentioned.

By "grinding" is meant machining by the removal of metal, whether a machining with a cutting tool by the removal of a metal chip or a machining of the milling type by the removal of metal particles. Such machining can be carried out both for finishing, that is to say directly after the manufacture of a valve stem, and for repair or reconditioning, that is to say for shaping the head of a worn valve in terms of profile and dimensions to those of a new or ground valve seat.

By "device" are meant appliances or installations which can range from a lightweight tool of the bench-tool type in a repair workshop to a much heavier machine of the machine-tool type, as used in factories for the series production of thermal engines.

In general terms, and as shown more particularly in FIG. 1, a valve 1 comprises a stem 1a of cylindrical or tubular shape and a head 1b of a shape widened continuously with the stem. This head 1a comprises a front or forward plane face 1g perpendicular to the valve axis and opposite the stem end or tail 1c. The face to be machined or ground is the rear face 1f, for example according to a conical surface 1i, concentric relative to the axis of the valve or axis of the stem 1a.

DESCRIPTION OF THE PRIOR ART

In 1950, the document U.S. Pat. No. 2,618,105 described and provided a device for grinding the head of a valve arranged horizontally, comprising:

a stand having the form of a horizontal plate, comprising a straight part and a part arranged obliquely relative to the latter, a means for supporting the valve stem in terms of rotation, mounted on the stand and comprising two supports spaced from one another and aligned in a horizontal reference direction; each support comprises, on the one hand, a V-shaped cradle for receiving rotationally an intermediate bearing zone of the valve stem, the aperture of which increases in width outward and upward on either side of a vertical reference plane of symmetry parallel to or passing via the abovementioned reference direction, and, on the other hand, a movable fence for rotational bearing, having the form of a flank of a bearing piece, arranged opposite the receiving cradle and forming with the latter a rotary stay for an intermediate pivoted zone of the valve stem, a movable stop for bearing rotationally against the valve tail, pointing in the horizontal reference direction, a means for driving the valve in rotation, arranged on the opposite side to the above-described means for supporting in terms of rotation, comprising a rotary driving rubber member for rotational coupling with the valve head via its front face opposite the rear face to be machined, for rotational adjustment, consisting of a viscoelastic mass of the rotary driving rubber member, making it possible to compensate the misalignment between the axis of rotation of the rotary driving member and the rigid axis of rotation of the valve stem during the grinding of the latter, a machining station mounted on the stand in angular relationship with the above-described means for supporting in terms of rotation, comprising a wheel or tool for machining the valve head on its rear face adjacent to the stem and a means for driving the machining tool in rotation about a horizontal machining axis forming an acute angle with the rigid axis of rotation of the valve stem.

Moreover, according to this document, to determine the inclination of the machining or grinding of the valve head, on the one hand the means for supporting the valve in terms of rotation can be oriented flat on the stand by rotation about a vertical axis, and on the other hand the machining station is itself arranged fixedly on the stand, in such a way that the machining axis always remains the same, whatever the inclination of the ground surface in relation to the axis of the valve.

The documents U.S. Pat. No. 1,702,267 and U.S. Pat. No. 1,786,022 described valve-grinding benches fairly close to that described by reference to the document U.S. Pat. No. 2,618,105, and it therefore seems unnecessary to describe the content of these other two documents in much greater detail.

The grinding devices provided by the documents examined above, working flat in a horizontal plane and therefore with the valve arranged horizontally and supported at two points on only one side, do not make it possible, in practice, to obtain a grinding concentric with the valve stem, at all events with the accuracy and tolerances required at the present time for the performance of internal-combustion engines.

In fact, this concentricity or coaxiality of the grinding makes it necessary to exert a minimum of forces or stresses on the rotating valve, whether on the head and/or on the stem, since these necessarily bring about a deformation or a displacement of the head in relation to the axis of rotation and consequently give rise to a defect in grinding concentricity or regularity.

Now if a valve is examined, it indeed proves per se to be an unbalanced component, the center of gravity of which is located on the head and which has a stem of a length greater than the height of the head. Under these conditions, the least bending or torsional stress can actually deform or displace the head in relation to the stem, or vice versa.

Arranging the valve horizontally, whilst maintaining it in terms of rotation by means of its stem alone, as provided by the document U.S. Pat. No. 2,618,105, merely increases the unbalance noted above, since, in particular, the heaviest part, namely the head, is then suspended relative to the stem which itself is supported firmly at two points. Under these conditions, it is normal to observe bending and torsion on the rotating valve head and consequently an inaccurate or irregular machining on the part to be ground.

Of course, what has just been noted is even more critical in respect of valves of large size and weight, such as those of a high-power engine. In particular, for such valves, it seems impossible to employ the grinding technique provided by the document U.S. Pat. No. 2,618,105.

The object of the present invention is, therefore, to overcome the abovementioned disadvantages. More specifically, the subject of the invention is a grinding device limiting the stresses exerted on the valve virtually to only the rolling necessary for the rotation of the head during the machining or grinding.

SUMMARY OF THE INVENTION

According to the invention, in cooperation, firstly the means for supporting the valve stem in terms of rotation is arranged fixedly and vertically on the stand, to provide a fixed and vertical reference system for the axis of rotation of the valve stem arranged in a vertical reference plane according to the diameter of the valve stem, secondly the means for driving the valve in rotation is arranged vertically, below the means for supporting in terms of rotation, and thirdly the machining station is mounted on the stand in a movable and orientable manner, about a horizontal axis, in order to adjust the machining axis in terms of orientation in relation to the fixed and vertical reference system of the valve stem.

The vertical head-down position adopted according to the present invention for grinding or machining the valve also affords decisive advantages.

First of all, the valve is in a self-stabilized position unaffected by gravity and as it were self-balanced. Thus, the stresses exerted on the head are now only those generated by driving its front face in rotation.

This self-stabilized position makes it possible easily to consider an automatic loading of the grinding device, which would be much more difficult for a machine with a horizontal positioning of the valve, in view of the unbalance brought about by the head.

This machining in the vertical head-down position gives the grinding device improved ergonomics and enables the operator to watch the grinding operations directly in front of him.

Finally, the principle adopted according to the invention seems compatible with all shapes, sizes and dimensions of valves.

BRIEF DESCRIPTION OF THE DRAWINGS

The present invention is now described with reference to the accompanying drawings in which:

FIG. 1 shows diagrammatically a vertical view of a grinding device according to the invention, FIG. 2a and 2b show diagrammatically, in horizontal section level with one of the supports of the device according to FIG. 1, the adaptation of the rotary stay obtained according to the invention, to the different diameters of the stem of the valve to be ground or machined, FIG. 13 shows diagrammatically another mass-balancing system belonging to a device according to FIGS. 8 and 9, FIG. 14 shows, in vertical section, a device for preadjusting the translational and height position of the means for driving the valve in rotation.

DESCRIPTION OF THE PREFERRED EMBODIMENTS

Figure 12:
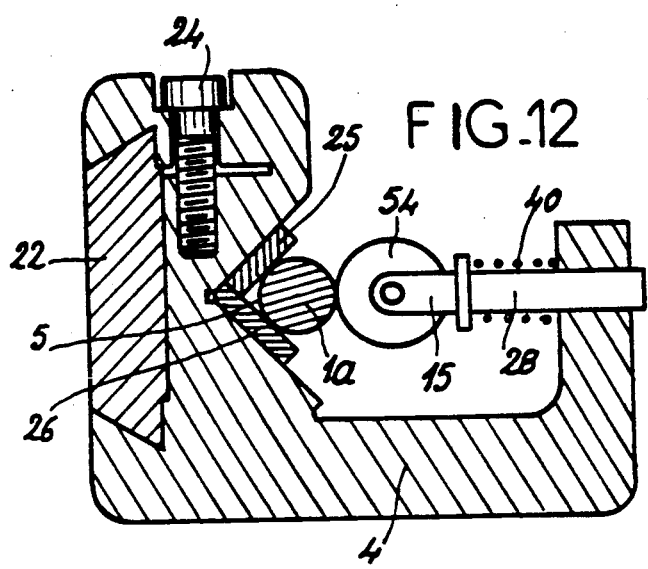
FIG. 12 shows, still in horizontal section, an alternative embodiment of a support forming part of a grinding device as illustrated in FIGS. 1 and 2, in a similar way to FIG. 10.

A grinding device according to the invention makes it possible to machine the head 1b of a valve 1, also possessing a stem 1a terminating in a tail 1c. The head 1b is arranged radially relative to the stem 1a and has a substantially plane front face 1g and a rear face 1f adjacent to the stem 1a. It is the edge 1i of the head 1b, located between the rear face 1f and the front face 1g, that is to be machined or ground according to any suitable transverse profile, for example with one or more angles, and according to all dimensions or measurements determined by those of the valve seat for which the ground valve is intended. The edge 1i has, for example, a general frustoconical shape about the axis of the stem 1a. In general terms, the machined valve possesses essentially a rotational symmetry about the above-mentioned axis. But in practice, of course, the treated valve can have various defects, such as:

axial play between the valve head 1b and the stem 1a defect of perpendicularity of the head 1b relative to the stem 1a planeness defect of the front face 1g.

As described below, the grinding according to the present invention makes it possible to grind the edge 1i in the axis of the stem 1a in spite of the abovementioned defects encountered in practice.

For this purpose, a device according to the present invention comprises in general:

a rigid stand 2, a means 3 for supporting the stem 1a in terms of rotation, constituting a rigid vertical reference system for the axis of rotation 14 or 14' of the abovementioned stem, the axis of rotation 14 or 14' lying in a vertical reference plane 7 corresponding to the plane of FIG. 1, whatever the diameter of the stem 1a of the ground valve, as shown in FIGS. 2a and 2b; in fact, these show a displacement or deviation "A" in reference plane 7 between a stem of relatively small diameter, represented by an unbroken line, of axis 14, and a stem of relatively large diameter, represented by a dot-and-dash line, of axis 14', a stop 8 for rotational bearing against the valve tail 1c, a means 9 for driving the valve in rotation, arranged vertically below and on the opposite side of the valve head 1b to the means 3 for supporting in terms of rotation and to the below-described machining station 10, the machining station 10 mounted orientably on the stand 2 in an angular relationship, for example at an obtuse angle, to the means 3 for supporting in terms of rotation.

The means 3 for supporting in terms of rotation comprises:

a bracket or slideway 22 mounted vertically on the stand 2 in a reference orientation or direction represented by the dot-and-dash line 6, two supports 4 and 49 aligned and superposed on the bracket 22 in the vertical reference direction 6, arranged at a distance from one another and adjustable in terms of position on the bracket or slideway 22 by means of adjusting screws 50 and 51; as shown in FIGS. 2a and 2b, each support comprises a cradle 5 consisting of two rollers 52 and 53, arranged facing one another symmetrically in relation to the reference plane 7, and a movable fence 15 for rotational bearing against the stem 1a, arranged opposite the receiving cradle 5 and possessing a roller 54 at its free end.

It emerges from the foregoing description that the cradle 5 serves for receiving in terms of rotation an intermediate bearing zone 1d or 1e of the valve stem 1a and that, as shown in FIGS. 2a or 2b, the aperture of the cradle 5 increases in width outward symmetrically on either side of the vertical reference plane 7 which is passes through the reference direction 6. Thus, the vertical reference plane 7 is defined by reference direction 6 and the axis of rotation 14 or 14'.

Still according to the foregoing description, each fence 15 being movable in the vertical reference plane 7 and extending perpendicularly to the reference direction 6, each receiving cradle 5 forms with the rotationally bearing fence 15 facing it a rotary stay 17 for an intermediate pivoted zone 1d or 1e of the valve stem 1a, the abovementioned two zones 1d and 1e being near the two respective ends of the stem 1a. As a result of the movability of the fences 15, the rotary stays 17 can be adapted to the actual diameter of the stem 1a, as shown in FIGS. 2a and 2b.

The stop 8 for rotational bearing against the tail 1c is mounted at the top end of the bracket 22 and is adjustable in terms of position by means of a screw 55, in the same way as each support 4 or 49. The stop 8 is therefore perpendicular to the reference direction 6, in vertical reference plane 7 and independent of the two supports 4 and 49.

The means 9 for driving the valve in rotation comprises:

a rotary driving member 18 in the form of a plate driven in rotation about the axis 20 by a first motor 56; this member serves directly or indirectly for rotational coupling with the valve head 1b on its front face 1g adjacent to the face or edge 1i to be machined, means 19 provided between the driving member 18 and the front face 1g of the valve for adjusting, in the reference plane 7, the driving axis of rotation 20 of the rotary member with the rigid vertical axis 14 of the valve stem determined by the two pivoted zones 1d and 1e in the two rotary stays 17 of the two supports 4 and 5 respectively; these means 19 consist simply of a pad 21 of a viscoelastic material, such as rubber, keyed in terms of rotation on the plate 18 by means of a diametral rib 18a provided on the latter and a corresponding groove 21a provided on the pad 21.

The latter performs several functions described below;

1) it makes it possible to couple rotationally, by friction, the rotary driving member 18 and the valve head 1b, more specifically its front face 1g; by adjusting the bearing force exerted on the tail 1c of the valve 1 by the stop 8, the pad 21 can thereby be compressed to a greater or lesser extent in the direction of the axis of rotation 14 and the rotational stress exerted on the head 1b thus adjusted, 2) since both the rotary driving member 18 and the driving axis of rotation 20 are defined, the pad 21 forms a rotational coupling link between the rotary member 18 and the front face 1g of the valve head 1b, while making it possible, by its rotational elastic bending between the driving axis 20 and the rigid axis of rotation 14, to compensate for any lateral misalignment between these two axes, this being obtained by transferring the drive torque toward the head 1b, 3) since the pad 21 is elastic under shearing stress, it constitutes a means of angular orientation 38 between the rotary driving member 18 and the front face 1g of the valve head, thus making it possible to compensate for any defect of perpendicularity of the abovementioned valve head in relation to the rigid axis of rotation 14 determined by the two pivoted zones 1d and 1e of the stem 1a, 4) since the outer face of the pad 21 is in contact with the front face 1g of the valve head 1b, the viscoelastic material used makes it possible to absorb any local planeness defect of the front face 1g.

The machining station 10 is mounted on a vertical angle piece 23 fixed to the stand 2. This station comprises a tool 11, such as a wheel, for machining the valve head on the rear face 1f of the valve 1. This tool is driven in rotation by a second motor 12 about a machining axis 13. The assembly 11/12 is orientable on the angle piece 23, about a horizontal axis, in order, according to the machining to be carried out, to adjust the axis 13 in the vertical reference plane 7 relative to the vertical reference direction 6 or the rigid axis of rotation 14 of the stem 1a.

Figure 3:
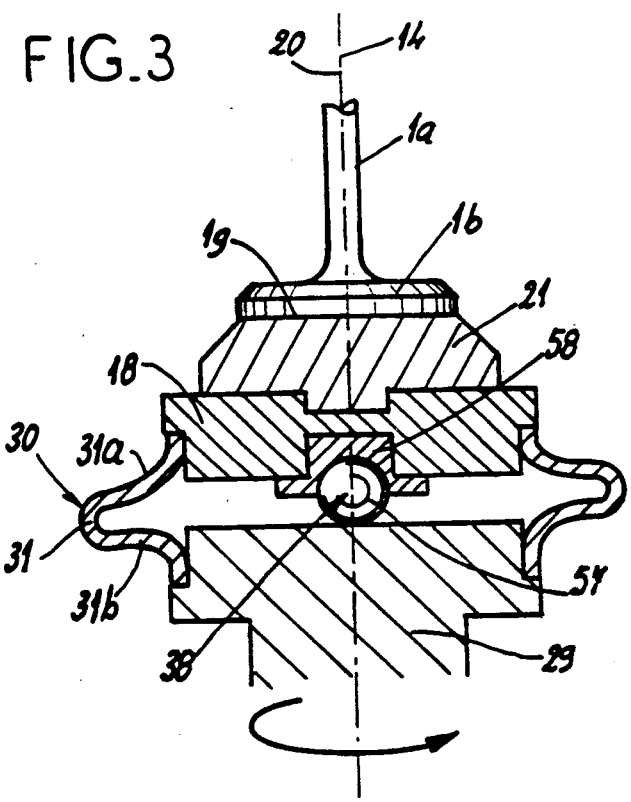
FIG. 3 shows diagrammatically, in vertical section, another embodiment of the means for driving the valve in rotation, according to the present invention.

According to FIG. 3, the rotary driving member 18 having the form of a disc can be displaced in translational movement in order during operation, that is to say during machining, to maintain the driving axis of rotation 20 parallel with the rigid axis of rotation 14. For this purpose, the rotary driving member 18 is engaged by a rotary shaft 29 likewise having the form of a disc, and an elastic concertina 31 circumscribing the disc 18 and end of rotary shaft 29 is arranged between these. The concertina 31 has a U-shaped cross-section, the two branches 31a and 31b of which are fixed respectively to the disc 18 and the end of rotary shaft 29. The coupling member 30 formed by the above-described concertina 31 makes it possible to compensate for angular misalignment and further, for any lateral misalignment between the rigid axis of rotation 14 and the axis of rotation of the rotary shaft 29.

According to the embodiment of FIG. 3, a specific means of angular orientation 38 is arranged between the driving disc 18 and the end of rotary shaft 29, in order to compensate any defect of perpendicularity of the valve head 1b in relation to the rigid axis of rotation 14 determined as above. This specific means consists of a ball 57 mounted on the driving disc 18 by means of a ball seat 58, and the ball 57 is capable of rolling on the inner face of the end of rotary shaft 29 in all directions, whilst making it possible to obtain a joint of the ball-and-socket type of the driving disc 18 on the ball 57. At rest, this ball 57 is located in the center of the driving disc 18 and the end of rotary shaft 29.

According to FIGS. 4 to 7, another solution is described below, making it possible to displace the rotary driving member 18 in terms of translational movement, while compensating for any angular and/or lateral misalignment between the rigid axis of rotation 14 and the end of rotary shaft 29. This solution has the advantage, in comparison with the above-described solutions, of generating virtually no stress on the valve head 1b during the machining.

According to FIGS. 4 to 7, the rotary driving member 18 having the form of a bell forms a first hub. The rotary shaft 29 has the form of a plate covered by the bell 18 and forming a second hub. As before, that is to say with reference to FIG. 3, the first driving hub 18 and the end of rotary hub 29 respectively comprise two mutually confronting cylindrical plates 18a and 29a bearing against one another both by means of a specific coupling member 30 described below and by a means of angular orientation 38 of the same type as that described with reference to FIG. 3.

The coupling member 30 comprises two pairs of identical washers 59 and 60. The washers 59, 60 are to one another by four spacers 99 shown in section in FIG. 7 and arranged at 90° relative to one another in relation to the axis 14.

Figure 5:
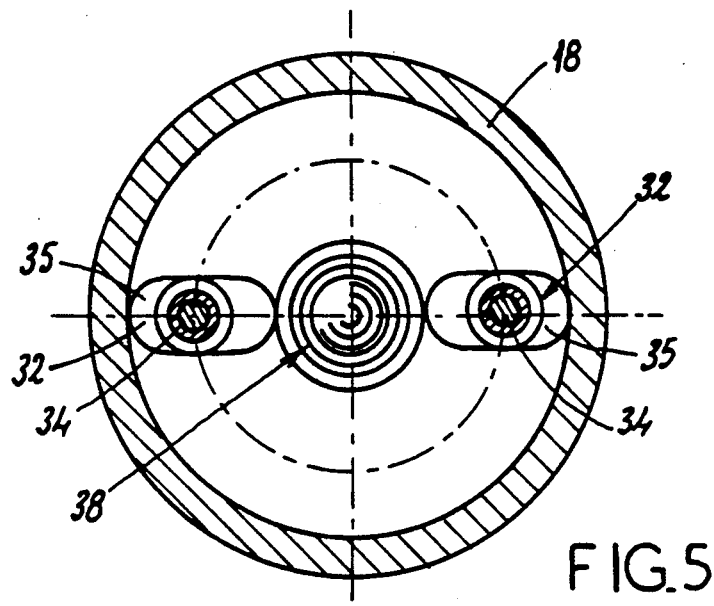
FIG. 5 shows the means for driving in rotation according to FIG. 4 in horizontal section along the line V—V of FIG. 4.
Figure 4:
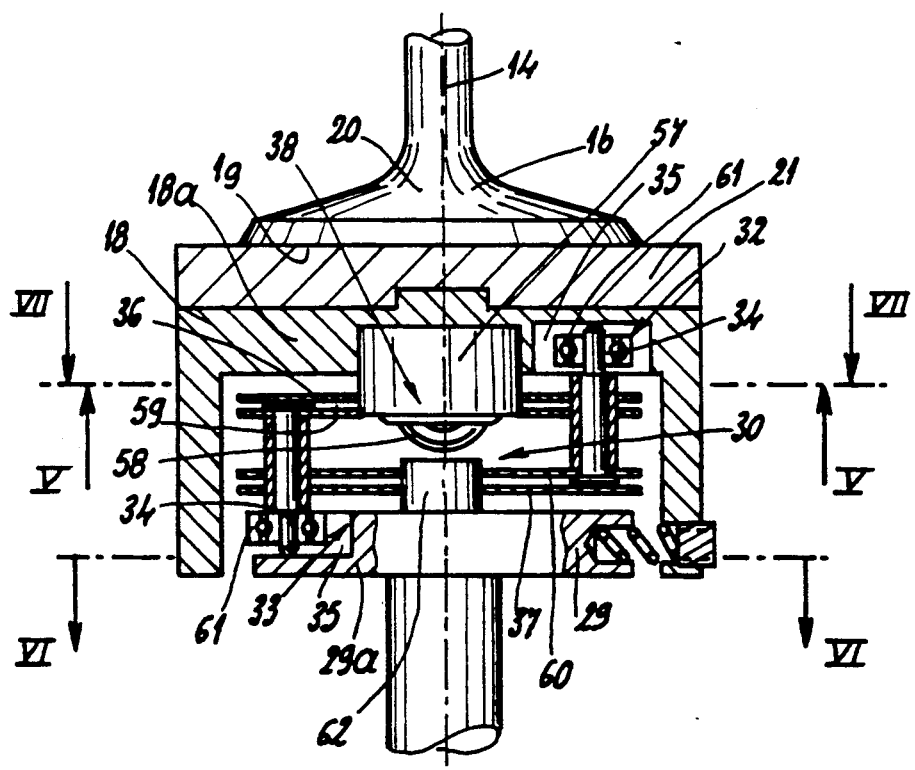
FIG. 4 shows, along the sectional line IV—IV of FIG. 7, another embodiment of the means for driving the valve in rotation, again according to the present invention.
Figure 6:
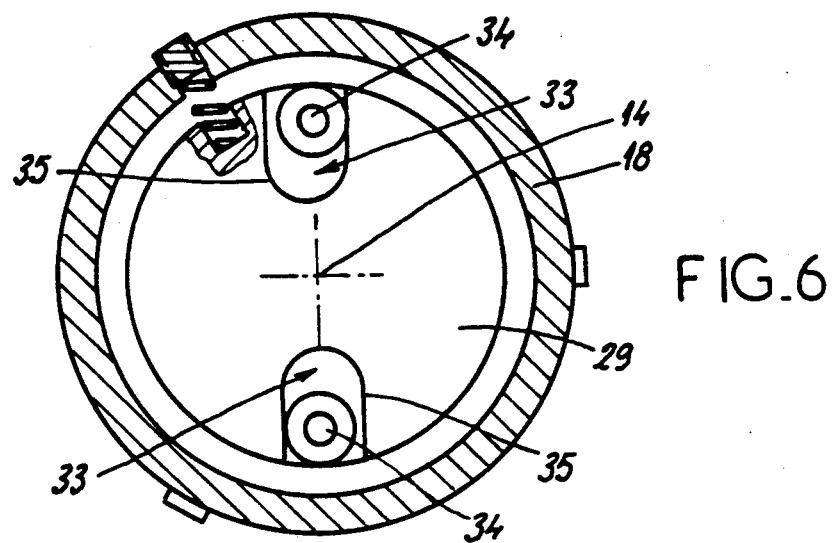
FIG. 6 shows the means for driving in rotation according to FIG. 4 in horizontal section along the line VI—VI of FIG. 4.
Figure 7:
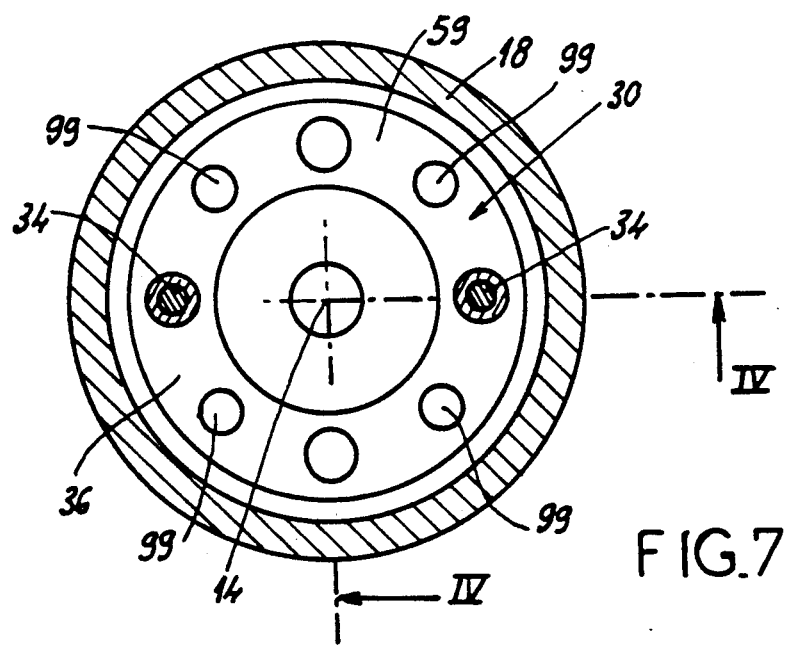
FIG. 7 shows the means for driving in rotation according to FIG. 4 in horizontal section along the line VII—VII of FIG. 4.

Two aligned slideways 32 comprising grooves 35 and pins 34, shown in FIGS. 4 and 5 and are arranged at the upper side of the coupling member 30. Two aligned slideways 33, comprising grooves 35 and pins 34, shown in FIGS. 4 and 6, and are arranged at the lower side of the coupling member 30. As illustrated by comparison of FIGS. 5 and 6, the slideways 33 are aligned in a direction perpendicular to the direction of alignment of the slideways 32. Each slideway 32 or 33 permits radial play by the cooperation with a pin 34 which spaces the two pairs of washers 59 and 60 and the outer head of which is equipped with a rolling bearing 61, and the groove 35 obtained by hollow casting in the cylindrical plate 18a and 29a respectively. The grooves 35 are open opposite the head of the pins 34 each with its bearing 61.

It emerges from the foregoing description that, in a given direction of radial play, two pins 34 forming male parts are mounted on the coupling member 30 separated by 180° along a radial axis passing through the vertical axis 14 or 20 of the two hubs 18 and 29 and that the two corresponding grooves 35 forming female parts are found on the relevant hub likewise at 180° relative to one another on opposite side of the axis 14 or 20 of the two hubs. Moreover, as in FIG. 3, a ball-and-socket orientation mechanism 57/58 bears on a stop 62 fixed to the inner face of the plate 29a of the rotary hub 29.

Of course, the solution described above can be reversed, in that the male parts of the slideways can be provided on the hubs 18 and 29, whilst the female parts can be provided on the coupling member 30.

According to the invention, and in a way not shown in the drawings, the rotary driying member 18 can be displaced in translational movement or laterally, in the vertical reference plane 7 by cooperating with means for regulating or adjusting the driving axis of rotation 20 and the rigid axis of rotation 14. These means then consist of a member of mechanical or suchlike type for positioning the rotary driving member 18 in the abovementioned reference plane proportionately to the position of the rigid axis of rotation 14 in the same reference plane. These adjustment means can comprise a member for measuring the position of the rigid axis of rotation (14 or 14'), such as a scale and a member for correcting the position of the rotary driving member 18, such as a scale acting proportionately to the measurement made by the measuring member.

Figure 8:
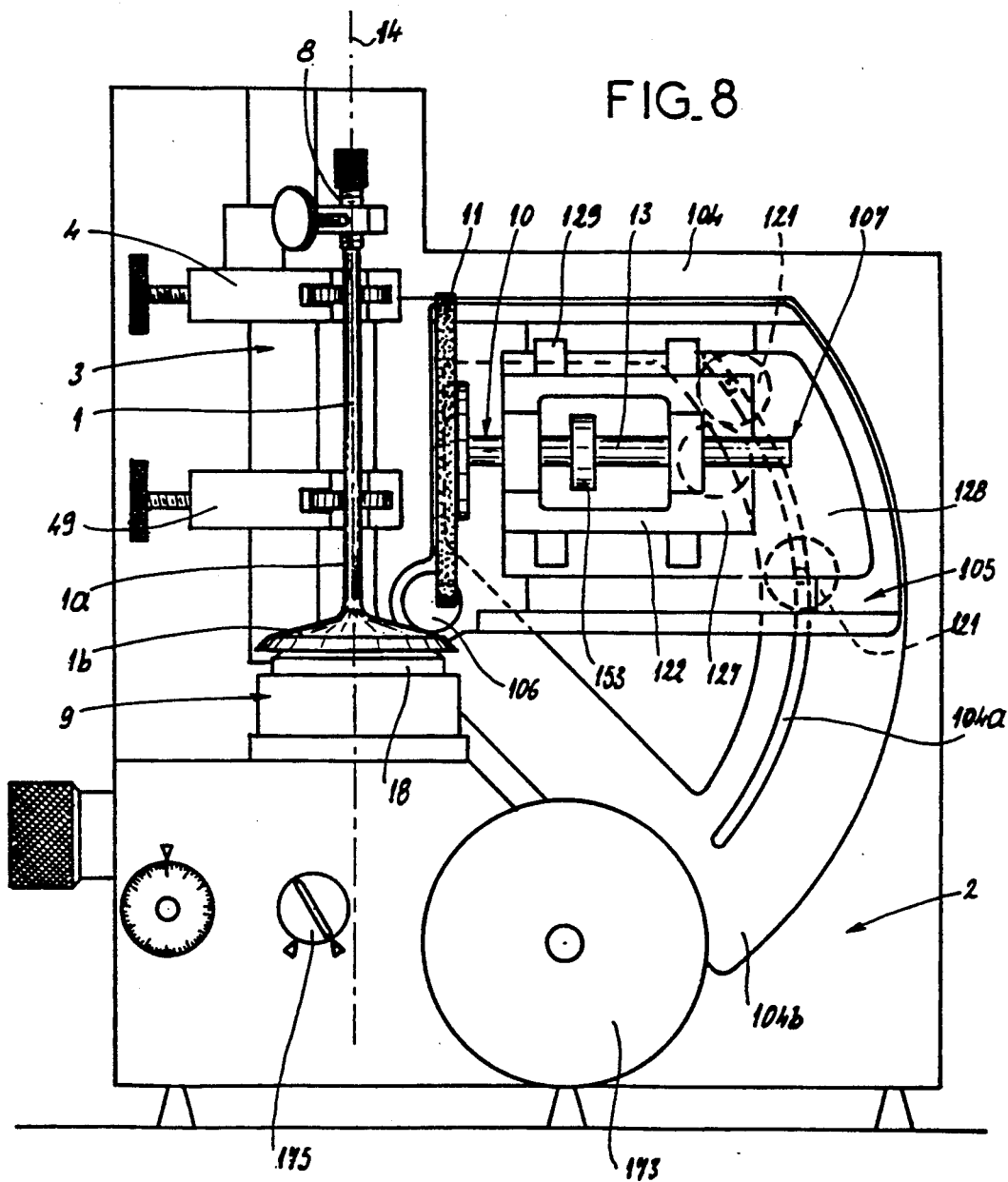
FIG. 8 shows a front view of another embodiment of the machine illustrated diagrammatically in FIGS. 1 and 2.
Figure 9:
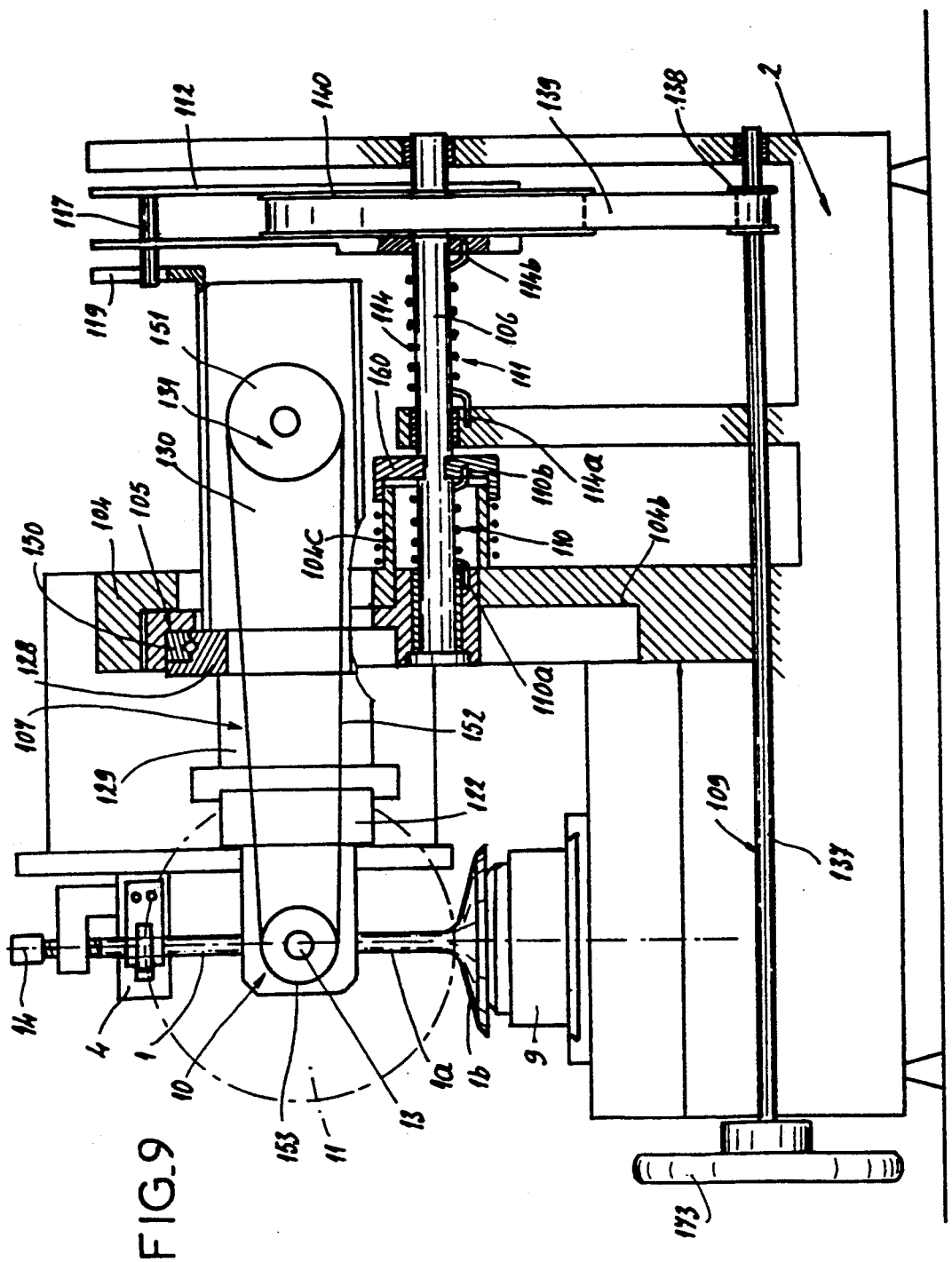
FIG. 9 shows partially cut away, in vertical section, the machine illustrated in FIG. 8.
Figure 10:
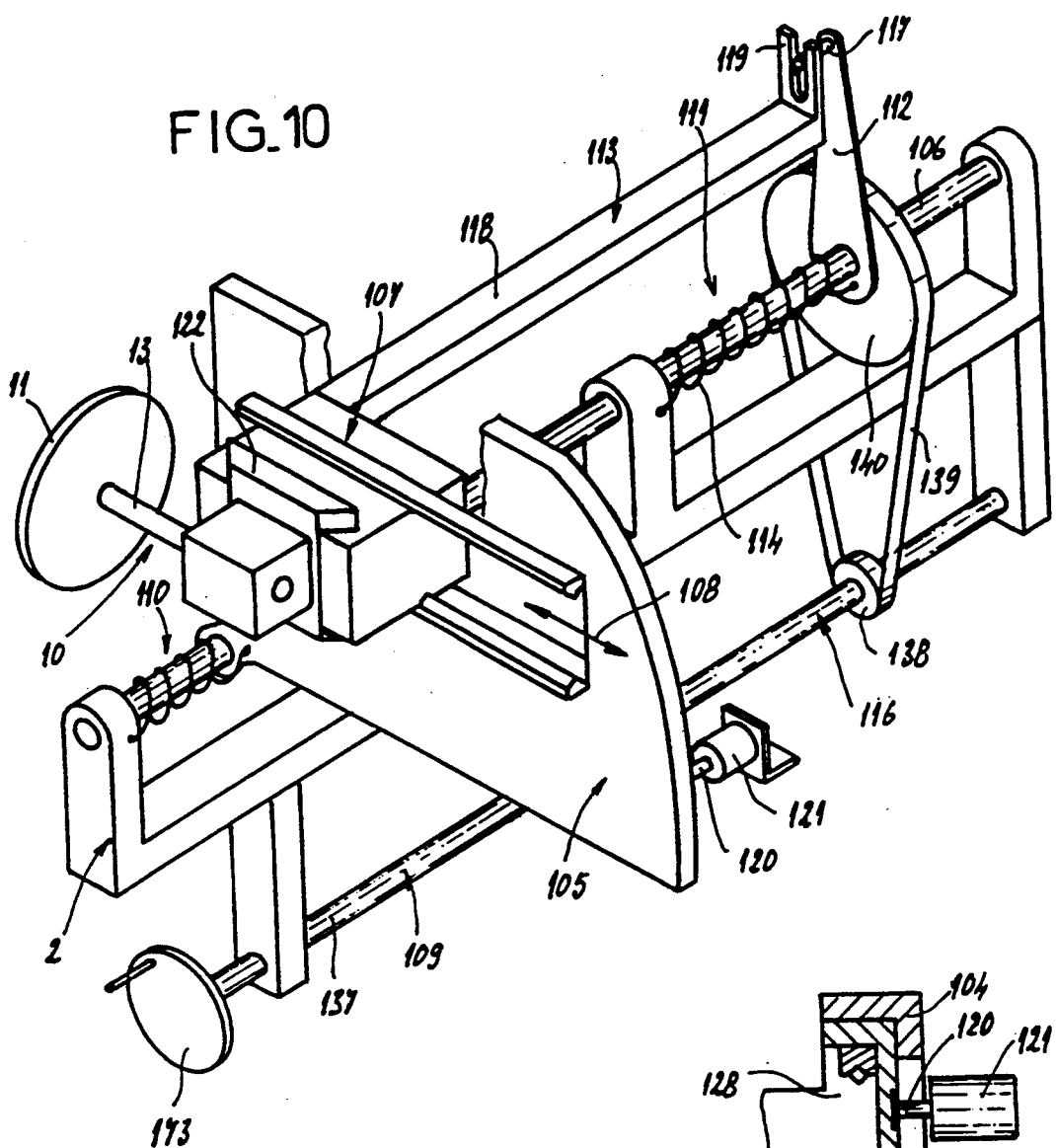
FIG. 10 shows diagrammatically, for explanatory purposes, the balancing and control system adopted for the machine according to FIGS. 8 and 9.

FIGS. 8 to 10 illustrate an embodiment of the machine described diagrammatically by reference to FIGS. 1 and 2, common reference numerals denoting the same elements or members.

According to these Figures, in order to support and position the machining station 10 in terms of both angle and distance in relation to the axis of rotation 14 of the valve 1, which is parallel to the vertical reference direction 6 defined by bracket 22 in FIG. 1, the following conditions of construction are adopted:

a rear vertical panel 104 belonging to the stand 2 extends both in the reference direction, that is to say vertically, and perpendicularly to the latter, that is to say horizontally, an orientation quadrant 105 of an extension parallel to the abovementioned panel, having the general form of a trapezium with a circular edge and mounted movably in terms of rotation on the stand 2 about a fixed horizontal axis 106 with a functional play allowing the quadrant 105 to slide flat on the panel 104; the axis of orientation 106 is perpendicular or orthogonal to the vertical reference direction 6, whilst being fixed and mounted on the rigid stand or frame 2, a carriage 107 is mounted movably in terms of translational motion on the orientation quadrant 105, the translational movability corresponding to an axis of translational movement 108 orthogonal to the axis of orientation 106, a plate 122 is mounted movably in terms of translational motion on the carriage 107 perpendicularly to the direction of translational movement 108, this plate supporting the machining station 10 and more specifically the axis of rotation 13 with the circular wheel 11.

For the clarity of the description, the assembly articulated about the fixed axis of rotation 106, comprising the orientation quadrant 105, the carriage 107 and the machining station 10 and all the members introduced hereafter and supported by the abovementioned elements, will be denoted by the common designation of "outfit".

It emerges from the foregoing description that the machining station 10 has three degrees of freedom, namely:

a first degree in rotation about the axis 106 by means of the orientation quadrant 105, a second degree in translational movement in the direction 108 orthogonal to the axis 106, and a third degree in translational movement perpendicular to the direction 108.

To control the machining station 10 in all these degrees, various control means are provided, with the operating knobs or handwheels attached to the front face of the stand 2.

Figure 11:
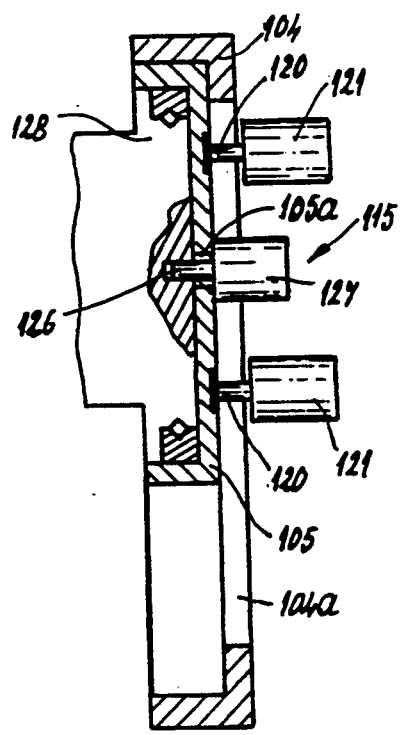
FIG. 11 shows in vertical section, through the appropriate sectional planes, the members for blocking the orientation quadrant and the carriage of the machining station, for example according to FIG. 10.

A blocking member 115 controlled in two positions by a knob 175 has two separate functions, one to stop the translational movement of the carriage 107, in which the orientation quadrant 105 remains free in terms of rotation about the axis 106, and the other to stop the rotation of the quadrant 105, in which the carriage 107 remains free in terms of translational movement on the quadrant 105. As shown in FIG. 11, the abovementioned functions are obtained by the arrangement and cooperation of the following members.

A first blocking member consists of the following elements:

the panel 104 has a recess 104b in the form of a sector of a circle centered on the axis 106, for receiving the quadrant 105, whilst at the same time allowing its angular travel about the axis 106; the lower face of the panel 104 in the region of the recess 104b has a guide slideway 104a in the form of an arc of a circle centered on the axis of orientation 106, the orientation quadrant 105 possesses two studs 120 passing through the slideway 104a with a suitable functional play and arranged on either side of said quadrant along the circular path determined by the slideway 104a, the two studs 120 each comprise a blocking head 121, for example actuable pneumatically, arranged on the other side of the panel 104 in relation to the quadrant 105 and displaceable over the height of a stud 120; such a displacement allows the two heads 121 to come into contact with the opposite face of the panel 104 in order to stop the rotation of the quadrant 105.

As a result of this arrangement, the quadrant 105 can be blocked firmly and rigidly in terms of rotation according to a specific triangle, as shown in FIG. 8, by means of the axis 106 and the two blocking heads 121.

A second blocking member ensuring the stopping and release of the carriage 107 in relation to the quadrant 105 is obtained as a result of the cooperation of the following means shown only in FIG. 11:

the orientation quadrant 105 has a guide slot 105a in the form of a straight line parallel to the direction of translational movement 108 of the carriage 107, the carriage 107 has a stud 126 passing through the slot 105a with a suitable functional play, a blocking head 127 is displaceable over the height of the stud on the other side of the quadrant, in order to come reversibly into contact with the rear surface of said quadrant and stop the translational movement of the carriage 107.

Furthermore, the control means 109 of the outfit articulated rotationally on the axis 106 comprise a member for controlling the carriage 107 alone, making it possible separately to displace the latter and to pivot the quadrant 105 about the axis 106 respectively for each of the two above-described stop functions selected by the selector 175. This control member comprises an arm 112 mounted perpendicularly in terms of rotation about the axis of orientation 106, a kinematic connection 113 converting the translational movement of the carriage 107 into a rotation of the arm 112, or vice versa, and a mechanism 116 for actuating the arm in rotation. As shown in FIG. 10, the kinematic connection 113 between the carriage 107 and the arm 112 comprises a crank 117 at the free end of said arm, a connecting rod 118 mounted on or fixed to the carriage 107 and extending in the direction of the axis of orientation 106, that is to say parallel to the latter, and a slotted link 119 located at the free end of the connecting rod 118, engaged on the crank 117 and arranged perpendicularly to the direction of translational movement 108. The mechanism 116 for actuating the arm in rotation comprises a shaft 137 which is mounted rotatably on the stand 2 and on which are keyed at one end a control handwheel 173 and, on the other side of the quadrant 105, a pulley 138; the latter drives in rotation by means of a belt 139 a wheel 140 mounted rotatably about the axis 106 freely in terms of translational movement relative to the latter over a particular range, the arm 112 being keyed and fixed in rotation on the pulley 140.

As shown better in FIG. 9, the carriage 107 has a stage 128 mounted movably in terms of translational motion in the direction 108 on the quadrant 105 by means of suitable slideways 150, on one side with a support 129 of the plate 122 and therefore of the machining tool 10, this support consisting of two parallel uprights with slideways, and on the other side with a carrier structure 130 extending opposite the support 129 and passing through the panel 104 of the frame 2 in a suitable orifice of the latter. A means 131 for driving in rotation. the machining tool 11, the axis of rotation 13 of which is parallel to the axis of translational movement 108 of the carriage 107, comprises a motor 151 supported by the carrier structure 130 and driving the shaft 13 by means of a belt 152 and a pulley 153 keyed on the shaft 13.

The mass-balancing system of the outfit articulated about the axis 106 comprises two complementary return members shown diagrammatically in FIG. 10 and as embodied in FIG. 9.

Diagrammatically shown in FIG. 10, a first member 110 consists of and is identified with a first means of rotational return or torsion spring arranged along the axis of orientation 106 between the stand 2 and the orientation quadrant 105. As shown in FIG. 9, this spring 110 comprises a movable strand 110a keyed in terms of rotation on the quadrant 105 and a stationary strand 110b retained in a plug 160 mounted freely in terms of translational movement, but fixedly in terms of rotation on a sleeve 104c arranged at the rear of the panel 104 which belongs to stand 2. The spring 110 is tensioned or loaded at the outset, that is to say in the position of rest of the outfit shown in FIG. 8 or 10, in order to exert a first return torque at least partially balancing the drive torque brought about by the weight of the said outfit.

A second return member 111 associates the above-described arm 112 and the above-described kinematic connection 113 and comprises a second means 114 for rotational return, or spring, arranged along the axis of orientation 106 between the stand 2 and the perpendicular arm 112. As shown in FIG. 9, the spring 114 comprises a stationary strand 114a keyed in terms of rotation on the frame 2 and a movable strand 114b keyed on the pulley 140 and therefore the arm 112. In the position of rest of the outfit shown in FIG. 10, the torsion spring is in a neutral position, that is to say is neither loaded nor unloaded in terms of torsion, and is arranged so as to become loaded under the effect of the translational displacement of the carriage 107 transmitted by the kinematic connection 113.

In terms of its principle and on the basis of the diagrammatic representation of FIG. 10, the action of the above-described mass-balancing system can be explained as follows.

FIG. 10 illustrates the device for positioning at rest, that is to say in a horizontal orientation of the orientation quadrant 105 and in the axial end position of the carriage 107, that is to say near the orientation axis 106. In this position of rest, the center of gravity at rest of the outfit consisting of the quadrant 105, the carriage 107, the plate 122, the machining tool 11 and other accessory members is near the axis of orientation 106.

In this position of rest, as already said, the first return member identified with the first torsion spring 110 is tensioned or already loaded, in order to exert a first return torque partially, if not completely balancing the downward drive torque resulting form the weight of the outfit exerted on its center of gravity at rest. As also already stated, in this position of rest, the second torsion spring 114 is in a neutral position, that is to say neither loaded nor unloaded in terms of rotation.

When the blocking member 115 is actuated in terms of its function of stopping the translational movement of the carriage 107, the head 127 comes into contact with the quadrant 105 and stops the translational movement of the carriage 107, whilst the two heads 121 are set apart from the adjacent face of the panel 104 and release the quadrant 105 in terms of rotation about the axis 106 in the relative positions shown in FIG. 11. By action by means of the handwheel 173 on the mechanism 116 for actuating the arm 112 in rotation, the rotation of the latter is converted by the kinematic connection 113 into a rotation of the quadrant 105 with its carriage 107; the abovementioned outfit is pivoted downward, reducing the drive torque under the effect of the weight, proportionately to the downward rotation of the outfit about the axis 106. Simultaneously, the torsion spring 110 is detensioned or unloaded by correlatively reducing the first torque returning the outfit rotationally upward, this being in ratio with the reduction of the drive torque resulting from the weight of the outfit.

By actuating the blocking member 115 in terms of its function of stopping the rotation of the quadrant 105, the head 127 is freed from the quadrant 105 and releases the carriage 107 in terms of translational movement, whilst the two heads 121 are blocked against the adjacent face of the panel 104 and stop the rotation of the quadrant 105. By action on the same actuating mechanism 116, that is to say that actuating the arm 112 in rotation, the downward rotation of the latter is then converted by the kinematic connection 113 into a translational movement of the carriage 107 toward the periphery of the quadrant 105; the carriage 107, the plate 122 and the machining head 11 are thus displaced toward the periphery of the quadrant 105 away from the axis of rotation 106. Correlatively, the center of gravity of the outfit articulated rotationally on the axis 106 is displaced in translational movement in the direction 108 and toward the periphery of the quadrant 105. This displacement of the center of gravity of the outfit gives rise itself, independently of the rotation of the outfit discussed above, to an increase of the downward drive torque, all else being equal, that is to say for an equal weight of the outfit.

Still under the effect of the translational displacement of the carriage 107 toward the periphery of the quadrant 105, the torsion spring 114 is tensioned or loaded in terms of rotation, exerting a second rotational return torque, separate from but complementing the first return torque resulting from the torsion spring 110. The second rotational return torque of the spring 110 increases in the direction of the translational displacement of the carriage 107 toward the periphery of the quadrant 105. This second torque is applied by means of the kinematic connection 113 to the outfit articulated about the axis 106. Thus, the second return torque increases proportionately to the increase of the drive torque caused by the weight of the outfit, solely under the effect of the translational displacement of its center of gravity.

In all, the two components of the displacement of the carriage 107, namely in rotation by means of the quadrant 105 and in translational movement on the latter, respectively generate a downward drive torque decreasing with the rotation and an excess torque, still driving downward, increasing with the translational movement. Correspondingly, by the means described above, the drive torque is compensated at the outset by the rotational return torque of the spring 110, with a reduction of the latter proportionate to the rotation of the outfit. The excess torque is itself compensated in a complementary way by the rotational return torque of the spring 114, with an increase in the latter proportionate to the translational movement of the carriage. Of course, the calibration of the torsion springs 110 and 114 can be selected so as to compensate by means of the spring 110 virtually the entire drive torque caused by the weight of the outfit and the excess torque virtually solely by means of the spring 114. However, the calibration of the springs 110 and 114 in relation to one another can be such that the spring 114 is torsionally stressed partially under the action of the weight of the outfit, in addition to the torsion under the effect of the excess torque discussed above.

According to FIG. 12, the rotary stay 17 can be obtained without rolling rollers, by providing, as shown in the abovementioned figure, a receiving cradle 5 having a V-shaped horizontal profile and equipped with two carbide inserts or pads 25 and 26 on the two sides of the V respectively. As regards the fence 15 for rotational bearing, this comprises, as shown diagrammatically in FIGS. 1 and 2, a press roller 54 mounted on a head which is returned in translational movement toward the valve stem 1a by a spring 40 acting in the vertical reference plane 7 and perpendicularly to the rigid axis of rotation 14. As shown in this same FIG. 12, the bracket 22 possesses a dovetail profile, on which the support 4 or 49 slides, a screw 24 making it possible to clamp said support on the bracket 22.

According to FIG. 13, the first rotational return means 110 has been omitted, and the second rotational return means 111 alone compensates both the downward driving torque generated by the weight of the outfit and the excess downward driving torque generated as a result of the translational movement of the carriage on the orientation quadrant. For this purpose, the return means 111 consists of the following elements, namely:

a finger 200 fixed to the arm 112 movable in rotation and extending perpendicularly relative to the end of the latter on the other side in relation to the kinematic connection 113; this finger therefore extends parallel to the horizontal axis 106, whatever the angular orientation of the arm 112, a junction piece 202 having the form of a small plate, arranged parallel to the stand 2 and articulated at one end about an axis 203 located in the vicinity of the axis 116 and parallel to the horizontal axis 106; this articulated junction piece comprises a perpendicular part, on which is mounted a screw 204, for adjustable abutment against the stand 2, a return jack 201 exerting a constant upward push, whatever the retraction of its rod into its body; the upper end of this jack is articulated on an axis 205 arranged in the extension of the finger 200 and the lower end on an axis 206 fixed to the junction piece 202 at a distance from the axis 203; the tensioning position of the jack 201 can be adjusted by means of the screw 204 in the position of the junction piece 202 bringing it up against the stand 2.

According to FIG. 13, the position of rest of the outfit is different from that described above and is defined, on the one hand, by the horizontal position of the orientation quadrant 105, and on the other hand, by the position of the carriage 107 completely away from the axis 106, that is to say to the right according to the arrow 108 of FIG. 10. From this position of rest, with the quadrant 105 remaining in the horizontal position, the displacement of the carriage 107 toward the axis 106 displaces the finger 200 and, by means of the jack 201, pulls the junction piece 202 which rotates upward about the axis 203. Still from the same position of rest as that identified above, with the carriage 107 remaining stationary in terms of translational movement, the downward rotation of the quadrant 105 does not change the position of the junction piece 202 which remains bearing against the stand 2 by means of the screw 204. In contrast, the direction of application of the return force of the jack 201 rotates about the fixed axis 206 in the counterclockwise direction, with an increase of its tangential component in relation to the axis 106 and therefore an increase of the rotational return torque exerted by the means 111. In all, for any translational position of the carriage 107 and any angular position of the quadrant 105, the rotational return torque exerted by the jack 201 acting from the stand 2 by means of the junction piece 202 is proportionate to the joint action of the above-defined driving torque and excess driving torque.

According to FIG. 14, this shows a member for preadjusting, in translational movement horizontally in the vertical reference plane 7 and vertically in terms of height, still in the same reference plane 7, the unit for the rotational drive of the valve 1, the means for driving in rotation 9, the means 19 for adjustment of rotation and the angular orientation means 38 which were described above and which are designated by the same reference numerals.

Starting from the observation that valve stems having a relatively small height likewise have a relatively small diameter, the preadjustment device makes it possible to raise the drive unit, whilst withdrawing it, or conversely to lower it, whilst advancing it.

This preadjustment device comprises:

a slideway 301 fixed to the stand 2 and oriented in the reference plane 7 perpendicularly to the axis of rotation 14 of the valve stem 1a, a plate 302 sliding on the slideway in the direction of the latter, a tubular sleeve or guide 303 supported and mounted beneath the plate 302 and elongate perpendicularly to the latter, a preadjustment control shaft 304 mounted freely rotatably, by means of bearing (not shown), on the sleeve 303 about an axis 308 fixed to the latter and oriented in the reference plane 7, perpendicularly to the axis of rotation 14, a means 305 converting the rotation of the shaft 304 into a translational movement of the plate 302 relative to the slideway 301; this means consists of a helical ramp 309 interacting with a stud 310 fixed to the stand 2, a cylindrical core or bush 306 mounted on and inside the guide 303, displaceable in translational movement over the height of the latter and returned upward by a spring 311; this bush supports the abovedefined drive unit by means of an axle 312 pivoted on said bush by means of two bearings 313 and 314 arranged respectively at its two ends; the lower end of the axle 312 external to the sleeve 303 is keyed in terms of rotation on a drive pulley 315, and a means 307 converting the rotation of the shaft 304 into a translational movement of the bush 306 relative to the guide 303; this means comprises a pinion 316 fixed to the inner end of the shaft 304, another pinion 317 arranged at right angles and freely rotatable relative to the sleeve 303 by means of a bearing 318, and a threaded piece 319 interacting with a complementary thread on the pinion 317; it is this piece 319 that forms an adjustable stop for the other end of the spring 311.

Moreover, a wedge 320 is arranged between the front face 1g of the valve and the disc 18a of the means 19 for adjustment of rotation.

As regards the rotary driving member 18 for rotational coupling to the valve head 1b, this can be a clamping member comprising three jaws at 120° relative to one another, each displaceable between a distant position freeing the valve head and a close position bearing on the edge of the same head. In the same way as before, the machining can be carried out on the rear face 1f of the valve head 1a.

With a grinding device as described above, it becomes possible to reduce the difference in concentricity between the ground part and the axis of the valve to below 2/100 mm.

We claim:

1. A device for grinding the head of a valve having a stem, a stem end, and a head opposite the stem end, the device comprising:

a rigid stand;

a first support for rotatably supporting the stem between the stem end and the stem head, said first support being mounted on the stand and comprising at least two second supports extending parallel to one another, the two second supports being separated from one another and each comprising a cradle for receiving the valve stem with an aperture in the cradle increasing in width outward on either side of a reference plane of symmetry passing through and including an axis of rotation of the valve stem, and a movable fence mounted opposite the cradle and forming with the cradle a rotary stay for the valve stem;

a stop for rotational bearing against the valve end;

a drive mechanism that drives the valve in rotation, the drive mechanism comprising a rotary driving member for rotationally coupling with the valve head on a front face of the valve head opposite a rear face to be machined;

a compensation member compensating for misalignment between a driving axis of rotation of the rotary driving member and the axis of rotation of the valve stem;

a machining station mounted on the stand apart from the first support for supporting the valve stem, the machining station comprising a tool for machining the rear face of the valve head and a second drive mechanism that drives the machining tool in rotation about a machining axis wherein the first support for supporting the valve stem in terms of rotation is vertically fixed to the rigid stand to maintain the axis of rotation of the valve stem in the reference plane of symmetry which is a vertical reference plane, and the machining station is mounted on the stand so that the machining tool is adjustable about an axis perpendicular to the vertical reference plane in order to adjust the machining axis in relation to the position of the rear face of the valve to be machined.

2. The device as claimed in claim 1, wherein the rotary driving member can be displaced in translational movement to align the driving axis of rotation with the axis of rotation of the valve stem and the rotary driving member is engaged by a rotary shaft with a coupling member arranged between the rotary shaft and the rotary driving member permitting compensation for minor misalignment between the axis of rotation of the valve stem and the driving axis of rotation of the rotary shaft, the rotary driving member and the rotary shaft each being fixed to a cylindrical plate, the cylindrical plates being linked to one another by means of the coupling member interposed therebetween, a first linkage between a first plate of the cylindrical plates and the coupling member and a second linkage between a second plate of the cylindrical plates and the coupling member, each of the first and second linkages comprising two slideways with radial play, the slideways of each linkage opposing one another on opposite sides of the driving axis of rotation of the rotary shaft, a line between the slideways of the first linkage being at right angles to a line between the slideways of the second linkage and each slideway comprising one of a combination of a male part provided on the coupling member and a female part provided on the cylindrical plate and a female part provided on the coupling member and a male part provided on the cylindrical plate.

3. The device as claimed in claim 2, wherein the cylindrical plate attached to the rotary driving member has a cylindrical portion attached to a periphery thereof to take a form of a bell covering the cylindrical plate fixed to the rotary shaft and the coupling member comprises at least two parallel washers fixed one to another.

4. The device as claimed in claim 3, wherein each slideway comprises a pin mounted on the coupling member and a groove provided in an opposing cylindrical plate.

5. The device as claimed in claim 2, further comprising an angular orientation mechanism of the rotary driving member for compensating for any defect of perpendicularity of the front face of the valve head to the axis of rotation of the valve stem, the angular orientation mechanism comprising a ball arranged between the rotary shaft and the rotary driving member substantially at their centers.

6. The device as claimed in claim 1, wherein, to orient and displace the machining station in relation to the fixed and vertical reference system of the valve stem, the rigid stand comprises a vertical panel, an orientation quadrant of an extension parallel to the panel is mounted movably to rotate about a horizontal axis of orientation, a carriage is mounted to permit translational movement on the orientation quadrant along an axis of translational movement orthogonal to the axis of orientation, and the machining station is mounted on the carriage.

7. The device as claimed in claim 6, in which means for controlling the orientation of the orientation quadrant and the translational movement of the carriage comprise a blocking member having at least two functions, a first function of stopping the translational movement of the carriage while the orientation quadrant remains free to rotate and a second function of stopping the rotation of the orientation quadrant while the carriage remains free for translational movement, and a member for controlling the carriage alone comprising an arm mounted perpendicularly to the axis of orientation, a kinematic connection converting one of the translational movement of the carriage into a rotation of the arm and a rotation of the arm into the translational movement of the carriage, and a mechanism for actuating the arm in rotation.

8. The device as claimed in claim 7, wherein the panel has a guide slideway in the form of an arc of a circle centered on the axis of orientation and the orientation quadrant possesses two studs that pass through the slideway, the studs spaced apart from one another.

9. The device as claimed in claim 8, wherein each stud comprises a blocking head arranged on a side of the panel opposite to that of the orientation quadrant, the blocking head displaceable over the length of the stud in order to come into pressing contact with the side of the panel and thereby stopping rotation of the orientation quadrant.

10. The device as claimed in claim 6, further comprising a plate that is mounted on the carriage so as to be capable of translational movement perpendicular to the translational movement of the carriage, wherein the machining station is fixed to the plate.

11. The device as claimed in claim 6, wherein the orientation quadrant has a guide slot in the form of a straight line parallel to the direction of translational movement of the carriage, the carriage has a stud passing through the slot, and a blocking head on the stud is displaceable over the length of the stud on a side of the orientation quadrant opposite to the carriage such that the blocking head may come into contact with the side of the orientation quadrant and stop the translational movement of the carriage.

12. The device as claimed in claim 6, wherein the carriage has a stage movable in the direction of translational movement on the orientation quadrant, a support for the machining tool on one side of the orientation quadrant, and a carrier structure extending on a side opposite to the orientation quadrant and passing through the panel.

13. The device as claimed in claim 12, wherein the second drive mechanism for driving the machining tool in rotation is mounted in the carrier structure.

14. The device a claimed in claim 7, further comprising a mass-balancing system, wherein the orientation quadrant and the machining station comprise an outfit and the mass-balancing system comprises at least one rotational return member connected between the stationary stand and the rotationally movable arm of the carriage control member, the return member at least partially compensating for excess downward driving torque generated as a result of the translational movement of the carriage on the orientation quadrant.

15. The device as claimed in claim 14, wherein the mass-balancing system further comprises a second rotational return member between the stationary stand and the orientation quadrant, the second rotational return member under tension when the outfit is at a position of rest to at least partially compensate for the downward driving torque generated by the weight of the outfit.

16. The device as claimed in claim 7, further comprising a mass-balancing system having a single rotational return member for compensating for both a downward driving torque generated by the weight of an outfit comprising at least the operation quadrant, the carriage and the machining station and an excess driving torque generated as a result of the translational movement of the carriage on the orientation quadrant.

17. The device as claimed in claim 1, further comprising a member for preadjusting the drive unit and the compensation member both in lateral displacement and height in the vertical reference plane, the preadjusting member comprising:

- a slideway fixed to the rigid stand and oriented in the vertical reference plane perpendicular to the axis of rotation of the valve stem;
- a plate sliding on the slideway;
- a guide supported and mounted beneath the plate and extending perpendicularly thereto, a rotary shaft of the rotary driving member extending through the guide;
- a rotatable preadjustment control shaft extending perpendicular to the rotary shaft and having an axis of rotation lying in the vertical reference plane;
- a first conversion mechanism converting the rotation of the preadjustment control shaft into a lateral movement of the plate relative to the slideway;
- a bush mounted on and displaceable over the height of the guide for supporting the drive unit; and
- a second conversion mechanism converting the rotation of a preadjustment control shaft into a displacement of the bush relative to the guide.

* * * * *